(12) United States Patent
Bahali et al.

(10) Patent No.: US 7,467,311 B2
(45) Date of Patent: Dec. 16, 2008

(54) DISTRIBUTED SYSTEM AND METHOD FOR MANAGING POWER USAGE AMONG SERVER DATA PROCESSING SYSTEMS

(75) Inventors: Sumanta K. Bahali, Cary, NC (US); Warren D. Bailey, Pittsboro, NC (US); Jimmy G. Foster, Sr., Morrisville, NC (US); Gregory D. Sellman, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/148,579

(22) Filed: Jun. 9, 2005

(65) Prior Publication Data

US 2006/0282685 A1 Dec. 14, 2006

(51) Int. Cl.
  *G06F 1/00* (2006.01)
  *G06F 1/26* (2006.01)
  *G06F 1/32* (2006.01)
(52) U.S. Cl. .................. 713/320; 713/300; 713/323; 713/324
(58) Field of Classification Search .................. 713/300, 713/320, 323, 324, 375
  See application file for complete search history.

(56) References Cited

U.S. PATENT DOCUMENTS

| | | |
|---|---|---|
| 5,249,297 A | 9/1993 | Brockmann et al. |
| 5,251,320 A | 10/1993 | Kuzawinski et al. |
| 5,307,409 A | 4/1994 | Driscoll |
| 5,398,244 A | 3/1995 | Mathews et al. |
| 5,483,656 A | 1/1996 | Oprescu et al. |
| 5,579,524 A | 11/1996 | Kikinis |
| 5,652,893 A | 7/1997 | Ben-Meir et al. |
| 5,719,800 A | 2/1998 | Mittal et al. |
| 5,724,592 A | 3/1998 | Garner |
| 5,752,050 A | 5/1998 | Hernandez et al. |
| 5,764,913 A | 6/1998 | Jancke et al. |
| 5,787,294 A | 7/1998 | Evoy |
| 5,987,614 A | 11/1999 | Mitchell et al. |
| 6,029,006 A | 2/2000 | Alexander et al. |
| 6,266,735 B1 | 7/2001 | Isobe |
| 6,301,527 B1 | 10/2001 | Butland et al. |
| 6,377,874 B1 | 4/2002 | Ykema |
| 6,477,483 B1 | 11/2002 | Scarlat et al. |
| 6,525,895 B2 | 2/2003 | Wakui |
| 6,564,274 B1 | 5/2003 | Heath et al. |
| 6,564,328 B1 | 5/2003 | Grochowski |
| 6,564,332 B1 | 5/2003 | Nguyen et al. |

(Continued)

*Primary Examiner*—Thuan Du
*Assistant Examiner*—Michael J Brown
(74) *Attorney, Agent, or Firm*—Cynthia S. Byrd; Dillon & Yudell LLP (57) ABSTRACT

A distributed method and system for managing power usage among server data processing systems are disclosed. According to one embodiment, a server data processing system of a plurality of server data processing systems is provided, where the server data processing system comprises a power management communication port to communicatively couple the server data processing system to all other server data processing systems of the plurality of server data processing systems and a system management processor coupled to the power management communication port. In the described embodiment, the system management processor comprises communication logic configured to monitor power usage of all the other server data processing systems of the plurality, and power management logic configured to perform a power management operation on the server data processing system based upon the monitored power usage.

12 Claims, 7 Drawing Sheets

U.S. PATENT DOCUMENTS

| | | |
|---|---|---|
| 6,643,771 B2 | 11/2003 | Tsushima et al. |
| 6,701,446 B2 | 3/2004 | Tsern et al. |
| 6,708,278 B2 | 3/2004 | Howard et al. |
| 6,802,014 B1 | 10/2004 | Suurballe |
| 6,836,849 B2 * | 12/2004 | Brock et al. ................ 713/310 |
| 6,931,553 B1 | 8/2005 | Plante et al. |
| 2002/0007463 A1 | 1/2002 | Fung |
| 2002/0062454 A1 | 5/2002 | Fung |
| 2003/0037268 A1 | 2/2003 | Kistler et al. |
| 2003/0055969 A1 | 3/2003 | Begun et al. |
| 2003/0061448 A1 | 3/2003 | Rawson, III |
| 2003/0065961 A1 | 4/2003 | Koenen |
| 2003/0131119 A1 | 7/2003 | Noonan et al. |
| 2005/0102544 A1 | 5/2005 | Brewer et al. |
| 2006/0168416 A1 | 7/2006 | Kessels et al. |
| 2006/0184287 A1 * | 8/2006 | Belady et al. ................ 700/291 |
| 2007/0005994 A1 | 1/2007 | Bahali et al. |

* cited by examiner

DISTRIBUTED SYSTEM AND METHOD FOR MANAGING POWER USAGE AMONG SERVER DATA PROCESSING SYSTEMS

CROSS-REFERENCE TO RELATED APPLICATIONS

The present application is related to the following United States Patent Applications, which are assigned to the assignee hereof and incorporated herein by reference in their entireties and for all purposes:

U.S. patent application No. 11/148,692 (Docket No. RPS920050052US1), entitled, "POWER MANAGEMENT SERVER AND METHOD FOR MANAGING POWER CONSUMPTION," naming Sumanta K. Bahali, , Warren D. Bailey, Jimmy G. Foster, Sr., and Gregory D. Sellman as joint inventors, and filed concurrently herewith.

U.S. patent application No. 11/148,581 (Docket No. RPS920050053US1), entitled, "POWER-MANAGED SERVER AND METHOD FOR MANAGING POWER CONSUMPTION," naming Sumanta K. Bahali, , Warren D. Bailey, Jimmy G. Foster, Sr., and Gregory D. Sellman as joint inventors, and filed concurrently herewith.

U.S. patent application No.11/148,580 (Docket No. RPS920050054US1), entitled, "SYSTEM AND METHOD FOR MANAGING POWER USAGE OF A DATA PROCESSING SYSTEM SUBSYSTEM," naming Sumanta K. Bahali, , Warren D. Bailey, Jimmy G. Foster, Sr., and Gregory D. Sellman as joint inventors, and filed concurrently herewith.

U.S. patent application No. 11/148,934 (Docket No. RPS920050055US1), entitled, "HIERARCHICAL SYSTEM AND METHOD FOR MANAGING POWER USAGE AMONG SERVER DATA PROCESSING SYSTEMS," naming Sumanta K. Bahali, , Warren D. Bailey, Jimmy G. Foster, Sr., and Gregory D. Sellman as joint inventors, and filed concurrently herewith.

BACKGROUND

1. Technical Field

Embodiments of the present invention relate generally to power allocation within a data processing system and more particularly to a distributed method and system for managing power usage among server data processing systems.

2. Description of the Related Art

Recently, the development of data processing systems (e.g., computer systems) has begun to focus on the amount of electrical power consumed rather than solely on more traditional aspects such as the volume of data stored, the speed at which operations are completed, or the flexibility of the types of operations which may be performed. This is true not only in the context of mobile data processing system devices where the weight and charge/discharge cycle time of portable power sources such as battery cells is critical, but also in the context of desktop or large data processing systems not intended to be user-portable.

In the larger data processing system context, a reduction in power usage or consumption may be necessary to achieve eligibility for certain environmental impact standards or labels such as the "Energy Star" rating system established by the United States Department of Energy and the Environmental Protection Agency or merely to reduce the cost of operating a data processing system associated with system power. The issue of power management is even more critical in larger scale data processing systems such as supercomputers, parallel processing data processing systems (e.g., massively parallel processing systems), server data processing system "farms", and rack servers.

A rack server is a data processing system including a storage rack element into which one or more server data processing system modules are inserted. In a typical configuration, a single power input or source (e.g., a conventional wall-mounted power outlet) is coupled to each storage rack element with power being distributed or subdivided among the elements of the rack as needed (e.g., via a power distribution unit or "PDU").

The available space of a rack server is typically defined in terms of rack units or "U" with storage rack elements being available in a variety of sizes (e.g., 14U, 25U and 42U). Conventional server data processing system modules are measured in terms of the number of rack units they occupy, with rack density being determined by the number of "U" occupied within a storage rack element. Until recently, a conventional rack server would include a 42U rack having 6 7U-sized server data processing system modules. More modern rack servers may frequently include 21 2U-sized server data processing system modules, 42 1U-sized server data processing system modules, or even 84 half rack unit-sized or "blade" server data processing system modules.

Each server data processing system module typically includes a separate power supply element and consequently, as the number of modules in a rack server increases, the amount of power consumed may increase disproportionately as compared with a rack server including a smaller number of larger modules. Electrical power usage in such power-dense rack servers may be so great that a single power input/source, server farm, or data center may be unable to provide sufficient power to operate all modules as needed.

In a conventional data processing system, power management is frequently accomplished by reducing rail or source voltages applied to a processing element (e.g., a central processing unit) or the frequency of a clock signal applied to such a processing element in response to a user selection of a particular power "mode" (e.g., maximum system performance or minimum power usage mode) or following the detection of an external event such as the application or removal of an external (e.g., alternating current) power source. While such power management techniques may result in a reduction in the amount of power consumed, they either require explicit user input which may not accurately reflect the power usage needs of a data processing system affected or operate completely independently of data processing system power requirements based upon external events. Moreover, such power management techniques provide no manner to coordinate the power usage of multiple data processing systems which depend on a single power input or source.

SUMMARY

A distributed method and system for managing power usage among server data processing systems are provided herein. According to one embodiment, a server data processing system of a plurality of server data processing systems is provided, where the server data processing system comprises a power management communication port to communicatively couple the server data processing system to all other server data processing systems of the plurality of server data processing systems and a system management processor coupled to the power management communication port. In the described embodiment, the system management processor comprises communication logic configured to monitor power usage of all the other server data processing systems of the plurality, and power management logic configured to perform a power management operation on the server data processing system based upon the monitored power usage.

The foregoing is a summary and thus contains, by necessity, simplifications, generalizations and omissions of detail; consequently, those skilled in the art will appreciate that the summary is illustrative only and is not intended to be in any way limiting. As will also be apparent from the accompanying description, the operations disclosed herein may be implemented in a number of ways including implementation in hardware, software, firmware, or a combination thereof, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of similar reference symbols in different drawings is intended to indicate similar or identical items.

DETAILED DESCRIPTION OF AN ILLUSTRATIVE EMBODIMENT

The following sets forth a detailed description of at least the best contemplated mode for carrying out the one or more systems, devices and/or processes described herein. The description is intended to be illustrative and should not be taken to be limiting.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment," "an embodiment," or "embodiments" are intended to indicate that a particular feature, structure, or characteristic described in connection with the embodiment is included in at least one embodiment of the present invention. The appearance of such phrases in various places within the specification are not necessarily all referring to the same embodiment, nor are separate or alternative embodiments mutually exclusive of other embodiments. Moreover, various features are described which may be exhibited by some embodiments and not by others. Similarly, various requirements may be described which are applicable to some embodiments but not other embodiments.

Embodiments of the present invention provide a distributed system and method for managing power usage among a group or plurality of server data processing systems within a data processing system such as a rack server. As all server data processing systems of a group sharing a single power input or source do not typically consume the maximum rated or required quantity of power substantially simultaneously, embodiments of the present invention enable a group (e.g., a rack, server farm, or data center) of server data processing systems to be supplied with significantly less power than the maximum configuration would require, while preserving application performance on all member or component server data processing systems. Within the present description, the term "power" is intended to indicate electrical power or data or a factor which represents or specifies electrical power or is proportional to electrical power (e.g., current, voltage, duty cycle, or the like).

According to one embodiment of the present invention, each server data processing system of a (power management) group monitors the power usage of all other server data processing systems of the group and determines (utilizing its own dynamically determined power usage) the total power usage of the group. According to one embodiment, power consumption or usage is monitored individually within each server data processing system by an associated power supply. Thereafter, data specifying the determined power usage is forwarded via a communication medium such as an inter-integrated circuit (I2C) bus to an associated system management or "service" processor.

Once determined, the total power usage of a group may then be compared to an associated power usage threshold to determine the level of power management to be applied. According to one embodiment of the present invention, a predetermined power usage threshold is provided to a server data processing system as a total power management group power field or record within a data processing system basic input/output system (BIOS) setup utility. According to another embodiment, such a power usage threshold may be provided remotely utilizing a system management processor.

According to one embodiment, a server data processing system monitors the power usage of other server data processing systems by receiving or collecting power usage data from all other server data processing systems of the group. Power usage data may comprise any data which specifies a power usage level of a corresponding server data processing system. Consequently, power usage data may specify a specific quantity of power consumed or data which may be utilized to determine such a specific quantity (e.g., a percentage of a known maximum or average power usage, power characteristics or attributes such as current, voltage, duty cycle, or the like as previously described).

In another embodiment of the present invention, each server data processing system also provides its own power usage data to each of the group's other server data processing systems. In additional alternative embodiments, other power management data may similarly be communicated between server data processing systems of a power management group. For example, a cumulative power usage reduction factor (e.g., a cumulative weighted throttling time) is provided by each server data processing system of a power management group according to one embodiment as will be described in greater detail herein.

In various embodiments of the present invention the communication of power usage data may be implemented using any of a number of techniques. For example, each server data processing system of a power management group may broadcast its power usage data to all other server data processing systems of an associated power management group. In another embodiment, power usage data may be requested explicitly and provided in a corresponding response to each request. Similarly, power usage data may be "pulled" by being read from a specific storage location or element or "pushed" by being written to or stored in a specific storage location or element within each server data processing system of a power management group.

Although in some embodiments of the present invention all server data processing systems of a power management group are configured or otherwise enabled to implement a distributed power usage management method as described herein, the present invention is not limited to use in such systems or conditions. In alternative embodiments, self-regulation of power usage as described herein may be implemented with respect to one or more server data processing systems of a power management group, with all remaining server data processing systems implementing an alternative (e.g., centralized) power management method or no power management method.

In still other embodiments of the present invention, the capability of reporting or otherwise providing power usage data may be independently implemented from the ability to perform power management operations (e.g., throttling) based upon such data. Consequently, some server data processing systems of a power management group may only report their power usage for use by one or more other server data processing systems in selecting a power management operation to be performed. Likewise, a server data processing system may receive power usage data and use such data to self-regulate its own power usage without providing power usage data to other server data processing systems in return.

Where a server data processing system of a power management group is not configured to provide power usage data explicitly, one or more of a number of alternative techniques may be implemented. According to one embodiment, such a server data processing system (and its associated power usage or power usage data) may be ignored or excluded for purposes of the distributed method and system for managing power usage described herein. In another embodiment, a predetermined or "default" power usage level or power management level may be assumed for each server data processing system which is incapable of providing its power usage data or level explicitly. In yet another embodiment, power usage of non-power management-enabled servers may be estimated or determined based upon other data obtained from such servers or from data available from other server data processing systems or system elements.

Once a distributed power usage management method-enabled server has compared the current total power usage of its power management group to a predetermined power usage threshold, the comparison result is utilized, according to one embodiment, to select a power management operation to be performed. In one embodiment of the present invention, power management is quantized into a number of predefined power management or "throttling" zones or levels. While the number, spacing, and definition of such power management levels may be arbitrarily established, power management levels are defined in one embodiment in 5 percent increments from 100 to 60 percent of the peak rated power usage of each element (e.g., server data processing system) of a power management group. If a given server (or component element thereof) is incapable of throttling at a desired level or granularity, a approximation technique could be used. For example, if a 5 percent reduction is requested and a server or element is only capable of throttling in 10 percent power usage increments, the request may be "rounded" resulting in a 10 percent reduction.

According to one embodiment of the present invention, each server data processing system of a power management group monitors the group's total power usage and reduces an associated power usage level commensurate with an increase in the power management level (e.g., of one quanta, level, or zone) in response to a determination that the group's total power usage has exceeded 98 percent of the combined peak rated power usage for the group for two or more seconds. In the described embodiment, each server data processing system of the power management group will continue to reduce its power usage level until total power consumption for the group is less than 93 percent of combined peak rated power usage for 2 or more minutes. For example, a power management level of each member of the power management group could be increased by one level or quanta every two seconds until the maximum power management state (e.g., a 40 percent throttling level or power usage reduction) is reached.

While particular time quanta have been described herein for purposes of illustration, any of a number of predetermined amounts of time could be used in alternative embodiments of the present invention. Similarly, while specific power usage level thresholds (e.g., 98 and 93 percent) have been described, other thresholds could be substituted in alternative embodiments. By reducing total power usage to at least 93 percent of the combined peak rated power usage, a power usage increase commensurate with a single step (5 percent) power management decrease of each component server should result in a power usage of, at most, 98 percent of the combined peak rated power usage for the group, thus preventing power management thrashing.

Although power usage throttling or management levels have been described herein, it should be appreciated that in some embodiments of the present invention such levels may not correspond directly to the quantity of power consumed by a given server data processing system. Rather, in the described embodiments, throttling or power management levels may serve as a power usage "ceiling" or maximum. Other factors, such as server data processing system workload, other power management or distribution processes, or the like may result in less than the maximum power usage allowed at a given power management level being consumed.

According to one embodiment, once power usage of a power management group has fallen below 93 percent of the group's peak value for two or more minutes, each server data processing system of the power management group may begin increasing power usage by decreasing the power management or throttling level. For example, each server data processing system may assume the next-lowest power management level for a predetermined time period (e.g., 10 seconds) until power management is no longer applied to any server data processing systems of the power management group (or until the predetermined power usage threshold is again exceeded as previously described).

Since all server data processing systems of a power management group may or may not throttle or implement power management in an identical fashion, (e.g., some may not be configured to perform distributed power management as described herein) fairness or equalization techniques may be implemented. According to one embodiment, each server data processing system of a power management group communicates (e.g., broadcasts) a cumulative power usage reduction factor to all other server data processing systems of the group. More specifically, in the described embodiment, a cumulative weighted throttling time is transmitted from each server data processing system to the remaining servers of the group.

According to one embodiment, a cumulative weighted throttling time is determined by multiplying a number representing the amount of time (e.g., the number of seconds) spent at each power management level by a number representing the power management level. For example, the numbers 1 through 8 may be used to represent power management levels corresponding to throttling or power usage reductions of 5 to 40 percent, respectively. Accordingly, a greater power reduction or degree of power throttling is given a greater "weight" for purposes of comparison between server data processing systems.

The amount of time spent throttling or otherwise in a reduced power usage state may consequently be equalized while decreasing the amount of power management needed by limiting peak power consumption slightly. In one embodiment, when any server data processing system of a power management group lags behind any other server data processing system of the group by more than 5 percent in terms of its cumulative weighted throttling time, that server is required to remain at least one power management level above the other server data processing systems until it is within 1 percent of the greatest cumulative weighted throttling time of the power management group. While the thresholds for weighted power management or throttling have been described herein with respect to percentages, in alternative embodiments other comparison techniques may be implemented.

Figure 1A:
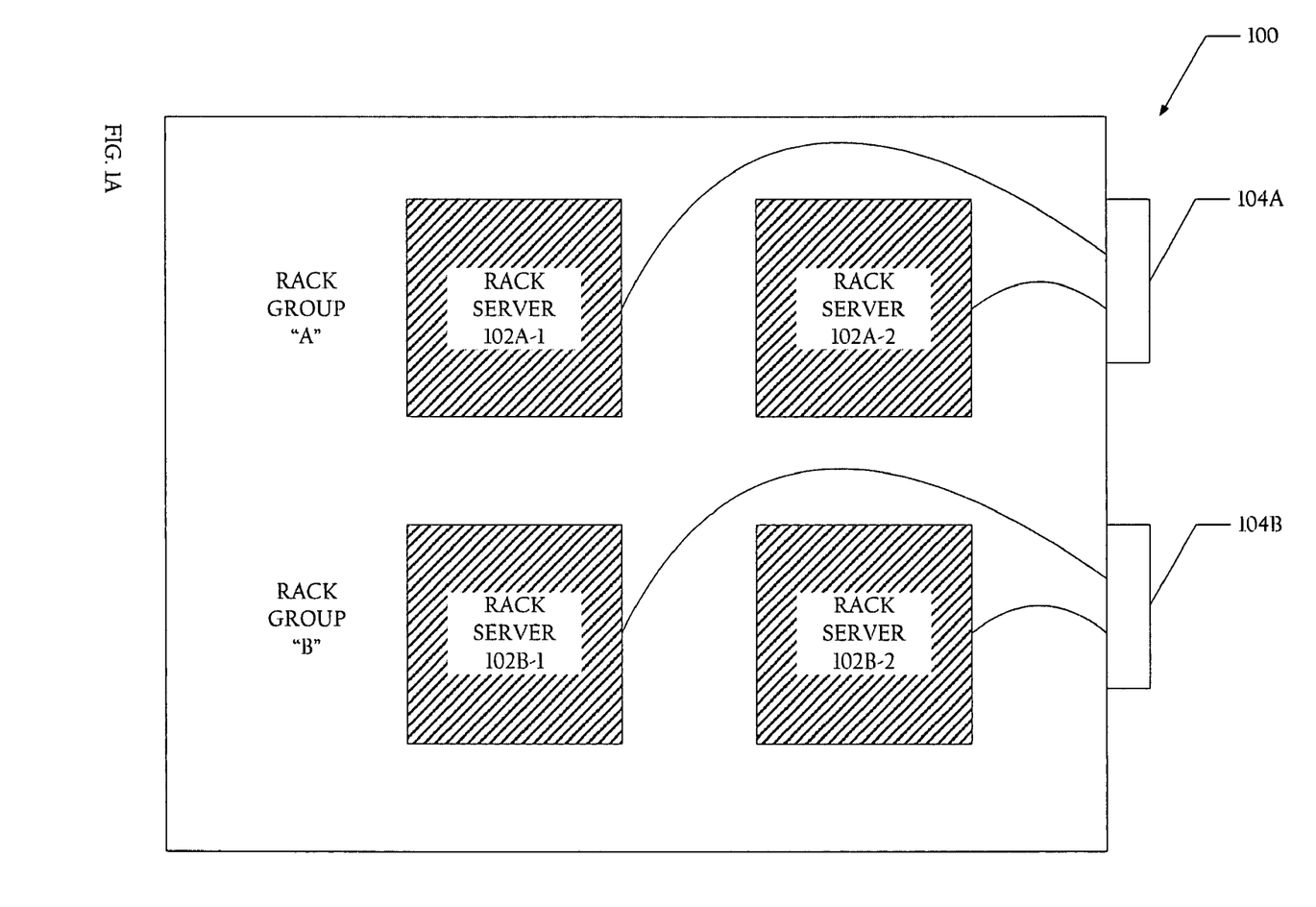
FIG. 1A is a plan view of a server farm including a plurality of rack servers as set forth in one or more embodiments of the present invention.

FIG. 1A is a plan view of the server farm including a plurality of rack servers as set forth in one or more embodiments of the present invention. As shown from above, server farm 100 of the illustrated embodiment of FIG. 1A includes a number of "rack groups" (e.g., rack groups "A" and "B") each including a number of rack servers 102. Rack group "A" of the depicted embodiment includes rack servers 102A-1 and 102A-2 each coupled to a corresponding power source 104A. Similarly, rack group "B" of the depicted embodiment includes rack servers 102B-1 and 102B-2 each coupled to corresponding power source 104B. While a particular number and configuration of rack servers has been shown in FIG. 1A for illustrative purposes, in alternative embodiments of the present invention any number of rack servers (or other groups of server data processing systems), rack groups, and power sources may be implemented.

Figure 1B:
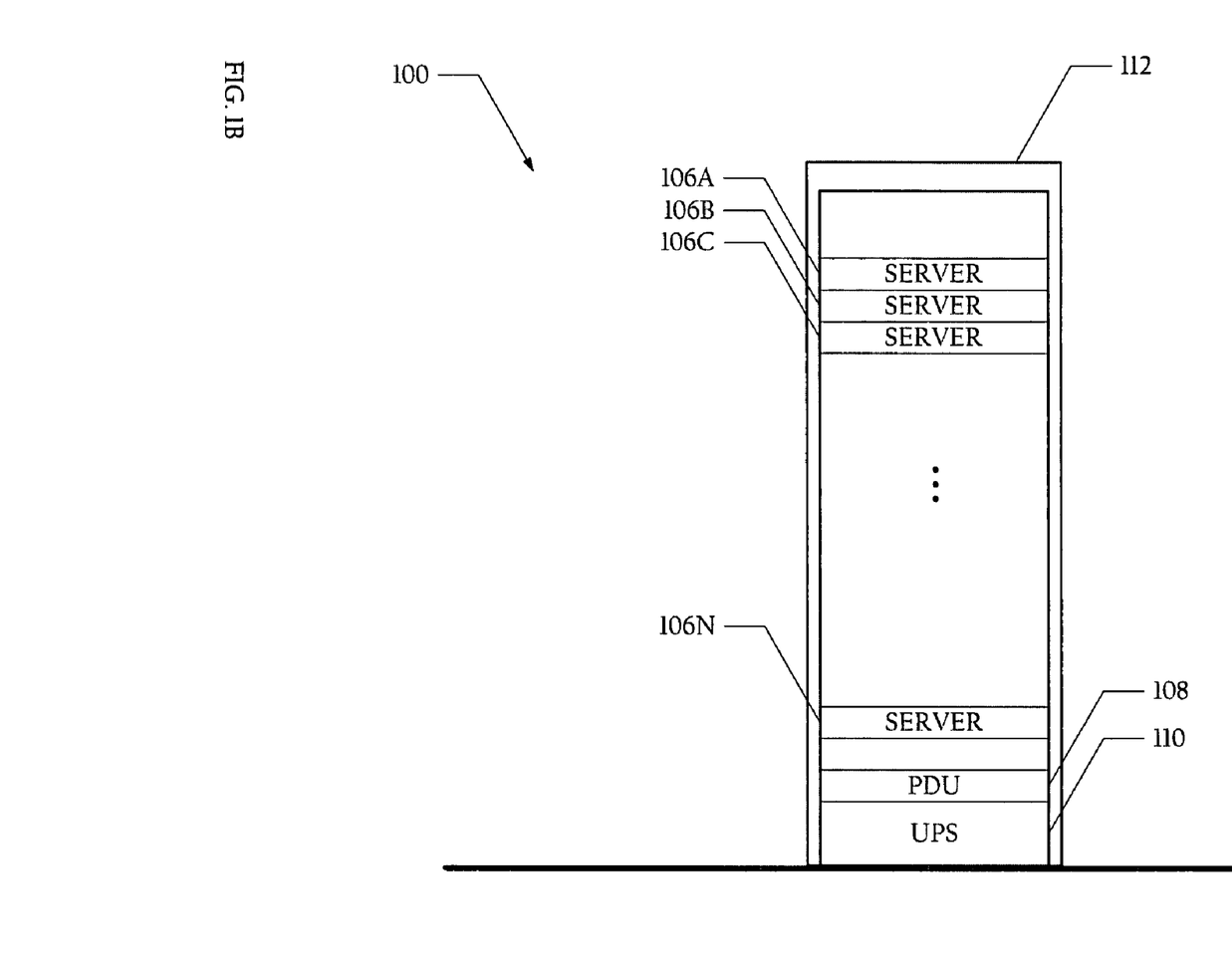
FIG. 1B is a front elevation view of a rack server of FIG. 1A.

FIG. 1B is a front elevation view of a rack server, such as rack server 102A-1 of FIG. 1A. The depicted rack server includes a plurality of server data processing systems (e.g., server data processing system modules 106A ... 106N as shown) as well as a power distribution unit (PDU) 108 and an uninterruptible power supply (UPS) 110 disposed within a storage rack element 112. In the illustrated embodiment, server data processing system modules 106, PDU 108, and UPS 110 may be coupled with one another utilizing one or more connection media (not illustrated) within storage rack element 112. In alternative embodiments, power distribution among server data processing system modules 106A ... 106N may be accomplished without the use of PDU 108 or UPS 110. Similarly, additional elements (e.g., input/output devices such as displays or keyboards, cooling devices, or the like) may be included within a rack server in other embodiments of the present invention.

Power distribution among server data processing system modules 106 is accomplished in the illustrated embodiment by coupling UPS 110 to a power supply (e.g., power source 104A of FIG. 1A) as well as to PDU 108. PDU 108 of the depicted embodiment is then in turn coupled to each of server data processing system modules 106A ... 106N. According to one embodiment, all elements (e.g., server data processing system modules) coupled to a single power supply compose a power management group.

To implement distributed power management according to one embodiment of the present invention, at least one of server data processing system modules 106 is configured (e.g., activated, enabled, designated, selected or the like) to monitor power usage of the remaining server data processing system modules 106 of the depicted rack server/power management group. Similarly, at least one of server data processing system modules 106 is configured to communicate or otherwise provide data specifying its power usage. In alternative embodiments of the present invention, power usage data may be communicated directly among server data processing system modules or consolidated and retransmitted by PDU 108, UPS 110, or another rack server element or module.

Figure 1C:
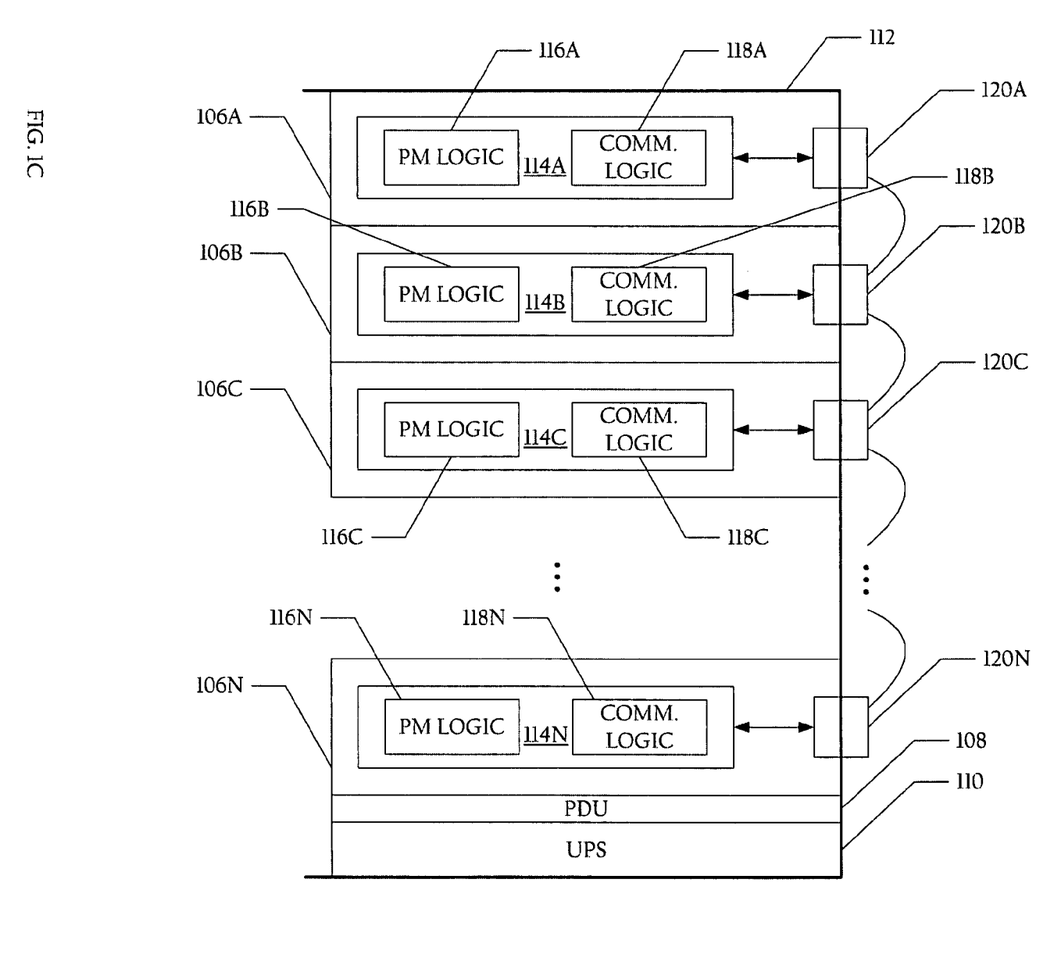
FIG. 1C is a cutaway side view of a rack server of FIG. 1A.

FIG. 1C is a cutaway side view depicting a rack server such as rack server 102A-1 of FIG. 1A. Disposed within storage rack element 112 of the illustrated rack server of FIG. 1C are each of server data processing system modules 106A ... 106N, PDU 108, and UPS 110 as previously described herein with respect to FIGS. 1A and 1B. In the illustrated embodiment, each of server data processing system modules 106A ... 106N includes a system management processor 114 and a power management communication port 120 coupled together as shown. Power management communication ports 120 enable server data processing system modules 106 to be communicatively coupled to one another via a communication link or media as has been illustrated. In the depicted embodiment of FIG. 1C, a serial or "daisy chain" connection method has been implemented. In alternative embodiments however, server data processing system modules 106 may be coupled together using a variety of topologies (e.g., a ring, bus, star, mesh, tree, or the like) and coupling means (e.g., via optical or electromagnetic and "wired" or "wireless" connection media).

Each system management processor 114 of the illustrated server data processing system module 106 includes power management logic 116 and communication logic 118. In operation, communication logic 118 is responsible for the reception and transmission of power usage data used to monitor the power usage of its associated server data processing system module 106 and power management group. In additional embodiments, communication logic may also be utilized for the communication of additional power management data. Power management logic 116 in operation is configured to process power usage data and to select and perform power management operations (e.g., the assumption of a power management state, associated throttling, and the like).

While each of server data processing system modules 106A ... 106N has been depicted within FIG. 1C as including both power management and communication logic elements, in alternative embodiments of the present invention such logic may be integrated into a smaller number of elements or further divided among a greater number of (e.g., logical, computational, or storage) elements. Moreover, while system management processors including power management and communication logic have been depicted in each of server data processing system modules 106, in alternative embodiments of the present invention one or more server data processing modules may lack such elements or functionality associated therewith. The term "logic" used herein, is intended to indicate any of a variety of data processing elements or modules including storage elements coupled with software, discrete or programmable hardware elements, or a combination thereof.

Although a group or plurality of server data processing systems have been described herein primarily as server data processing system modules within the context of a rack server, embodiments of the present invention are not limited to use in conjunction with rack servers or component modules thereof. For example, in alternative embodiments of the present invention, a group or plurality of server data processing system may comprise one or more free-standing, enclosed server data processing systems a combination of free-standing, enclosed server data processing systems and server data processing system modules of a rack or blade server. According to one embodiment, a plurality of group of server data processing systems is defined by coupling to a particular power input or source (e.g., a wall outlet, a power line/link, a power substation, or the like).

Figure 2:
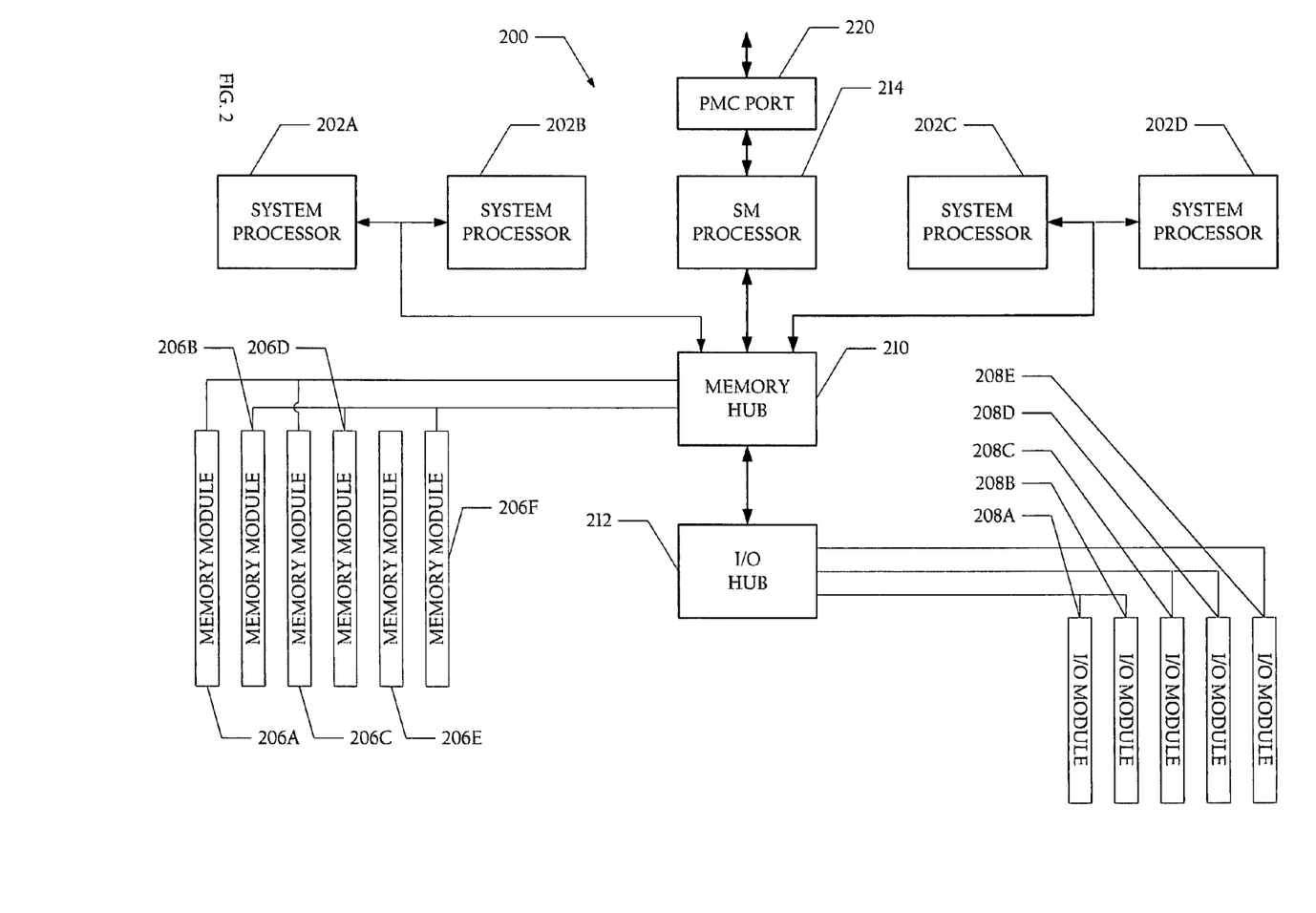
FIG. 2 is a high-level internal block diagram of a server data processing system according to an embodiment of the present invention.

FIG. 2 is a high-level internal block diagram of a server data processing system module according to an embodiment of the present invention. With reference to FIG. 2, a more detailed description of the internal components of a server data processing system module such as a component server data processing system module 106 of rack server 102A-1 of FIG. 1A is provided. While a particular number and arrangement of elements has been illustrated with respect to server data processing system module 200 of FIG. 2, it should be appreciated that embodiments of the present invention are not limited to data processing systems having a particular number, type, or arrangement of components and so may encompass a wide variety of data processing system types, architectures, and form factors (e.g., network elements or nodes, personal computers, workstations, servers, or the like).

Server data processing system module 200 of the depicted embodiment includes a number of system processors 202A . . . 202D and a system management processor 214 coupled to memory modules 206A . . . 206F and input/output (I/O) modules 208A . . . 208E via a memory hub 210 and an I/O hub 212 as shown. Server data processing system module 200 of the illustrated embodiment further includes a power management communication port 220 as described further herein.

Memory (not illustrated) coupled with one or more of memory modules 206A . . . 206F may comprise any of a number of system memory-type storage elements such as random access memory (RAM), read-only memory (ROM), flash memory, and cache. Similarly, an I/O device (not illustrated) coupled with one or more of I/O modules 208A . . . 208E may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present invention may include software, data processing hardware, and various processing operations further described herein. The features and process operations of the present invention may be embodied in executable instructions embodied within a machine-readable medium such as a memory coupled with a memory module of memory modules 206A . . . 206F, a storage device, a communication device or medium, or the like. A machine-readable medium may include any mechanism that provides (i.e., stores and/or transmits) data in a form readable by a machine (e.g., server data processing system module 200). For example, a machine-readable medium may include but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as one or more of system processors 202A . . . 202D and/or system management processor 214, programmed with the instructions, to perform operations, methods or processes of the present invention. Alternatively, the features or operations of the present invention may be performed by specific hardware components that contain hard-wired logic for performing such operations, or by any combination of programmed data processing components and custom hardware components.

The present invention has been described in the context of fully functional data processing system; however, those skilled in the art will appreciate that the present invention is capable of being distributed as a program product in a variety of forms and of being applied equally, regardless of the particular type of machine-readable or signal-bearing media used to carry out the distribution. Examples of signal-bearing media include recordable media such as floppy disks and CD-ROM, transmission type media such as digital and analog communications links, as well as media storage and distribution systems. Embodiments of the present invention may similarly be implemented using software modules used to perform certain operations or tasks. The described software modules may include script, batch, library, or other executable files and may be stored on a machine- or computer-readable medium. Thus, the modules may be stored within a computer system memory to configure a data processing or computer system to perform one or more functions of a software module. Various types of machine or computer-readable storage media may be used to store the modules discussed herein.

Figure 3:
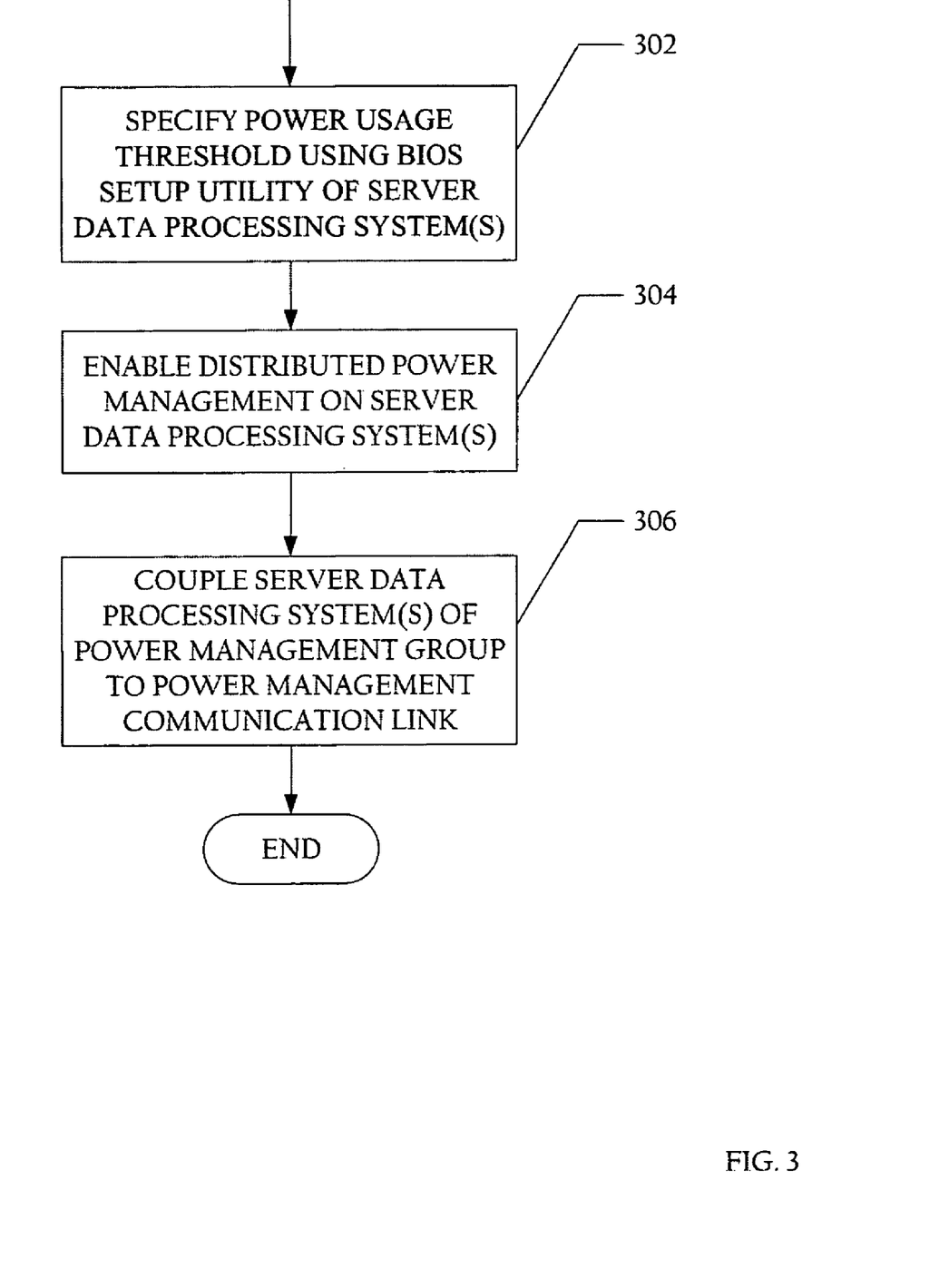
FIG. 3 illustrates a high-level flow diagram of a distributed power management system configuration process according to an embodiment of the present invention.

With reference to the figures and in particular to FIG. 3, a high-level flow diagram of a distributed power management system configuration process according to an embodiment of the present invention is illustrated. In the illustrated process embodiment, distributed power management is initiated by specifying a power usage threshold using, in the depicted embodiment, a basic input/output system (BIOS) setup utility (process block 302) of one or more server data processing systems within a power management group of such systems. While a predetermined power usage threshold has been described herein, in alternative embodiments of the present invention a power usage or consumption threshold may be determined dynamically and may likewise be determined using a computer or software-implemented algorithm or process rather than being user-specified.

Once a power usage threshold has been specified, distributed power management is enabled on one or more server data processing systems of a corresponding power management group (process block 304). In various embodiments of the present invention, such enablement of a server data processing system may take a variety of forms and/or utilize a variety of techniques. For example, such enablement may occur automatically in response to: the specification of a power management group's power usage threshold, the coupling of a server data processing system to a communication medium, the receipt of power usage data from other server data processing systems, or the like.

Thereafter, each distributed power management-enabled server data processing system of a corresponding power management group is coupled to a power management communication link (process block 306). In one embodiment, a power management communication link comprises a serial or "daisy chain" electrical connection having one or more individual conductors or transmission lines. In other embodiments of the present invention, any of a variety of topologies and/or coupling means or media may be implemented.

Figure 4:
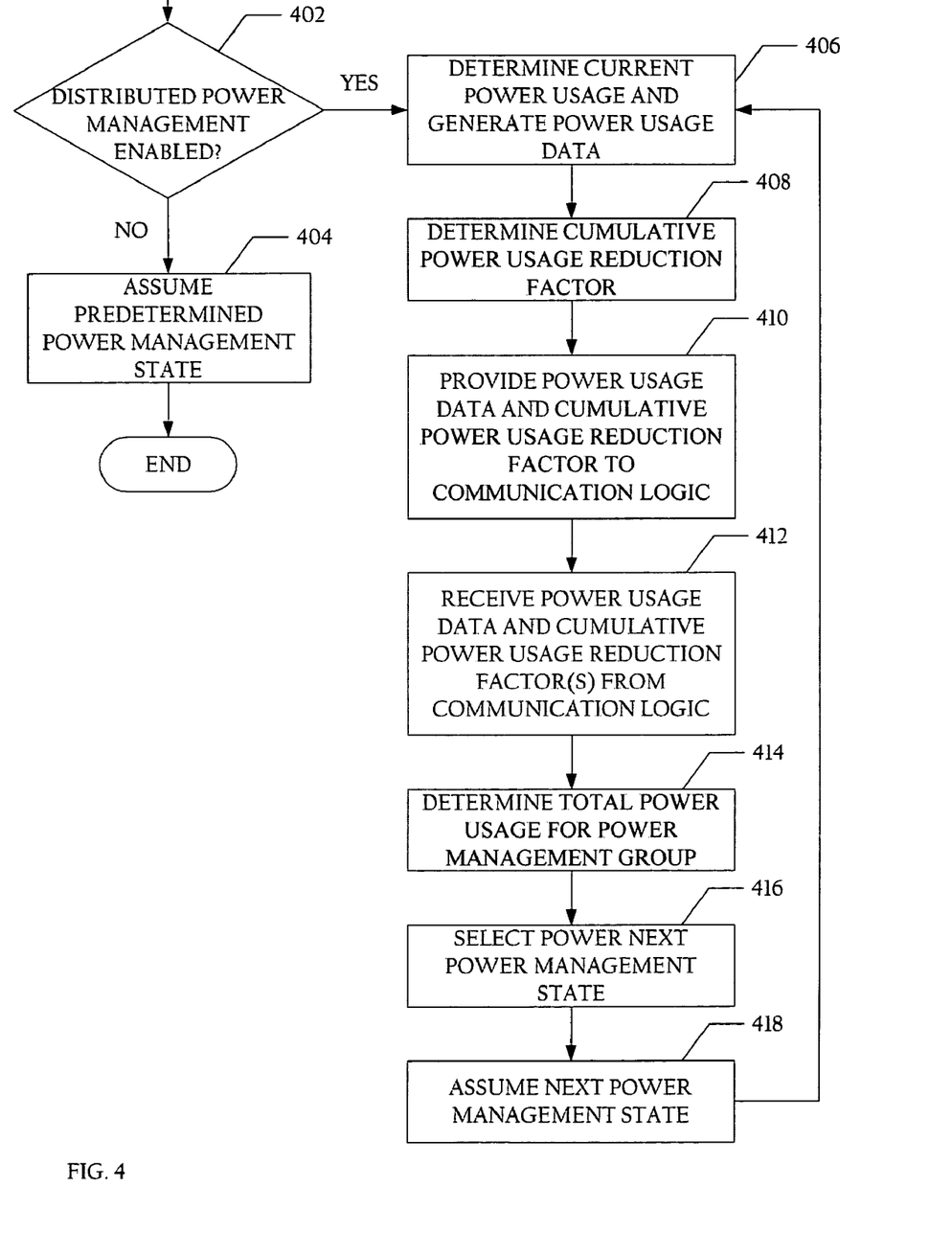
FIG. 4 illustrates a high-level flow diagram of an operational process of power management logic of a system management processor according to an embodiment of the present invention.

With reference to the figures and in particular to FIG. 4, a high-level flow diagram of an operational process of power management logic of a system management processor according to an embodiment of the present invention is illustrated. In the depicted process embodiment, a determination is initially made whether an associated server data processing system (e.g., a server data processing system including a system management processor in which power management logic implementing the depicted method resides) is enabled to perform a distributed power management method as described herein (process block 402). In response to a determination that the subject server data processing system is not capable of performing such a distributed or "self-regulating" power management process, a predetermined power management or usage state is assumed (process block 404).

Following a determination that the associated server data processing system may perform a distributed power management method as illustrated and described herein by contrast, the server data processing system's current power usage is determined and corresponding power usage data is generated (process block 406). Thereafter in the illustrated process embodiment, a cumulative power usage reduction factor (e.g., a cumulative weighted throttling time) is determined (process block 408). Once both the power usage data and cumulative power usage reduction factor have been determined, they are provided as power management data to communication logic of an associated system management or "service" processor (process block 410).

Power management data (e.g., power usage data and cumulative power usage reduction factor(s)) corresponding to other server data processing systems of an associated power management group is then received from associated communication logic (process block 412) according to the illustrated process embodiment. The received power usage data, along with the known power consumption of the current or subject server data processing system is then used to determine the total power consumption of the server's power management group (process block 414). The next power management state for the current server data processing system to assume is then selected (process block 416) and assumed (process block 418) before the illustrated process embodiment is repeated in part as indicated, beginning again at process block 406.

According to one embodiment of the present invention, the next power management state to be assumed is selected based upon a comparison of the power management group's computed total power usage and the predetermined power usage threshold. More specifically, if a power usage threshold has been exceeded by the most-recently determined total power consumption, a next-highest power management level or state is selected (corresponding to a next-lowest power usage quantity). In various embodiments, determined power may comprise the instantaneous power used by a server or alternatively the total power consumed since an immediately-preceding measurement. Similarly, power may include alternating current and/or direct current power, root-mean-square (RMS) or peak power, or the like. In another embodiment of the present invention, the next power management state to be assumed is selected based upon determined and/or received cumulative power usage reduction factors as previously described. In yet another embodiment, priority values (e.g., static or dynamic priority values) may additionally or alternatively be utilized.

Figure 5:
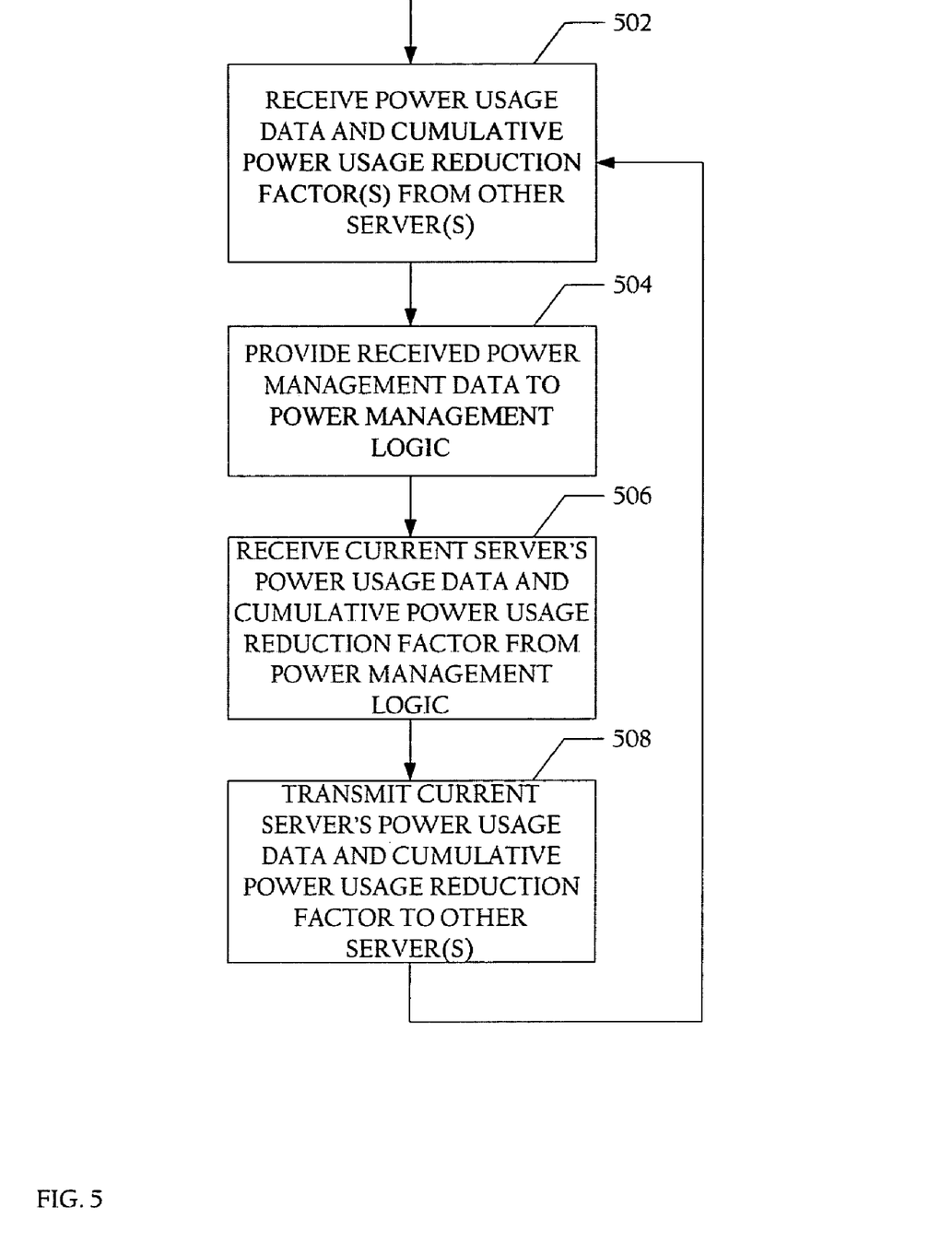
FIG. 5 illustrates a high-level flow diagram of an operational process of communication logic of a system management processor according to an embodiment of the present invention.

With reference to the figures and in particular to FIG. 5, a high-level flow diagram of an operational process of communication logic of a system management processor according to an embodiment of the present invention is illustrated. In the illustrated process embodiment, power management data (e.g., power usage data and cumulative power usage reduction factor(s)) is initially received from other server data processing systems (process block 502). Thereafter, the received power management data is provided to power management logic residing in a system management processor of an associated server data processing system (process block 504).

Once the power usage data and cumulative power usage reduction factor(s) received from other server data processing systems have been provided as described, similar data, corresponding to a server data processing system including communication logic implementing the depicted method embodiment is received (process block 506). This received data is then transmitted to each of the other servers or a subset thereof (e.g., those servers configured to implement distributed power management as described herein) of an associated power management group (process block 508). The illustrated process is then repeated as shown.

Although the flow diagrams depicted in FIGS. 3-5 indicate a particular order of operation and a specific granularity of process operations, in alternative embodiments the illustrated orders may be varied (e.g., process operations may be performed in another order or performed substantially in parallel) and one or more of the process operations may be coalesced or fragmented. Similarly, addition process operations may be added where necessary in alternative embodiments of the present invention. For example, while power consumption or usage data has been depicted as being received from other server data processing systems prior to being transmitted or "broadcast" by a server, in alternative embodiments, the described order may be reversed, or such operations may be performed substantially in parallel.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Consequently, the invention is intended to be limited only by the scope of the appended claims, giving full cognizance to equivalents in all respects.

What is claimed is:

1. A server data processing system of a plurality of server data processing systems for managing power usage, said server data processing system comprising:

a power management communication port to communicatively couple said server data processing system to all other server data processing systems of said plurality of server data processing systems, wherein each server data processing system is a unit server rack separate from the other server data processing systems and each server data processing system may comprise multiple processors; and a system management processor coupled to said power management communication port comprising, communication logic configured to;

monitor power usage of said all other server data processing systems, and determine a total power usage of said plurality of server data processing systems utilizing said power usage data corresponding to said server data processing system and said power usage data corresponding to each of said all other server data processing system of said plurality of server data processing systems;

receive, from each of said all other server data processing system of said plurality of server data processing systems, corresponding power usage data; and transmit power usage data corresponding to said server data processing system to each of said all other server data processing system of said plurality of server data processing systems, wherein each server data processing system of said plurality has a full complement of power usage data from all other server data processing systems; and power management logic configured to;

perform a power management operation on said server data processing system based upon said power usage of said all other server data processing systems; and select said power management operation based upon said total power usage of said plurality of server data processing systems;

wherein said power management operation includes one or more of: applying a cumulative power usage reduction factor, such as a cumulative weighted throttling time, for each server data processing system; establishing a throttling level utilizing one of a plurality of available levels, which level is selected based on a current cumulative power usage; adjusting the throttling level to enable increased power usage when the cumulative power usage falls below a pre-established threshold.

2. The server data processing system of claim 1, wherein said power usage data corresponding to said server data processing system comprises a cumulative power usage reduction factor corresponding to said server data processing system, and said power management logic is further configured to select said power management operation based upon said cumulative power usage reduction factor.

3. The server data processing system of claim 1, wherein said server data processing system further comprises a storage element to store data specifying a power usage threshold, and said power management logic is further configured to compare said total power usage to said power usage threshold and to select said power management operation in response to a comparison of said total power usage and said power usage threshold.

4. The server data processing system of claim 1, wherein said power management logic is further configured to select a power management state of a plurality of power management states based upon said total power usage of said plurality of server data processing systems and to assume said power management state.

5. A method for managing power usage within a server data processing system of a plurality of server data processing systems, said method comprising:

communicatively coupling said server data processing system to all other server data processing systems of said plurality of server data processing systems, wherein each server data processing system is a unit server rack separate from the other server data processing systems and each server data processing system may comprise multiple processors;

monitoring power usage of said all other server data processing systems utilizing communication logic of a system management processor of said server data processing system;

receiving power usage data from each of said all other server data processing system of said plurality of server data processing systems utilizing said communication logic;

determining a total power usage of said plurality of server data processing systems utilizing said power usage data corresponding to said server data processing system and said power usage data corresponding to each of said all other server data processing system of said plurality of server data processing systems;

transmitting power usage data corresponding to said server data processing system to each of said all other server data processing system of said plurality of server data processing systems utilizing said communication logic, wherein each server data processing system of said plurality has a full complement of power usage data from all other server data processing systems;

performing a power management operation on said server data processing system based upon said power usage of said all other server data processing systems utilizing power management logic of said system management processor; and selecting said power management operation based upon said total power usage of said plurality of server data processing systems utilizing said power management logic;

wherein said power management operation includes one or more of: applying a cumulative power usage reduction factor, such as a cumulative weighted throttling time, for each server data processing system; establishing a throttling level utilizing one of a plurality of available levels, which level is selected based on a current cumulative power usage; adjusting the throttling level to enable increased power usage when the cumulative power usage falls below a pre-established threshold.

6. The method of claim 5, wherein said power usage data corresponding to said server data processing system comprises a cumulative power usage reduction factor corresponding to said server data processing system, and said method further comprises selecting said power management operation based upon said cumulative power usage reduction factor utilizing said power management logic.

7. The method of claim 5, wherein said server data processing system further comprises a storage element to store data specifying a power usage threshold, and said method further comprises comparing said total power usage to said power usage threshold, and selecting said power management operation in response to said comparing utilizing said power management logic.

8. The method of claim 5, further comprising:

selecting a power management state of a plurality of power management states based upon said total power usage of said plurality of server data processing systems utilizing said power management logic.

9. A machine-readable storage medium having a plurality of instructions executable by a machine embodied therein, wherein said plurality of instructions when executed cause said machine to perform a method for managing power usage within a server data processing system of a plurality of server data processing systems, said method comprising:

communicatively coupling said server data processing system to all other server data processing systems of said plurality of server data processing systems, wherein each server data processing system is a unit server rack separate from the other server data processing systems and each server data processing system may comprise multiple processors;

monitoring power usage of said all other server data processing systems utilizing communication logic of a system management processor of said server data processing system;

determining a total power usage of said plurality of server data processing systems utilizing said power usage data corresponding to said server data processing system and said power usage data corresponding to each of said all other server data processing system of said plurality of server data processing systems;

receiving power usage data from each of said all other server data processing system of said plurality of server data processing systems utilizing said communication logic;

transmitting power usage data corresponding to said server data processing system to each of said all other server data processing system of said plurality of server data processing systems utilizing said communication logic, wherein each server data processing system of said plurality has a full complement of power usage data from all other server data processing systems;

performing a power management operation on said server data processing system based upon said power usage of said all other server data processing systems utilizing power management logic of said system management processor; and     selecting said power management operation based upon said total power usage of said plurality of server data processing systems utilizing said power management logic;

wherein said power management operation includes one or more of: applying a cumulative power usage reduction factor, such as a cumulative weighted throttling time, for each server data processing system; establishing a throttling level utilizing one of a plurality of available levels, which level is selected based on a current cumulative power usage; adjusting the throttling level to enable increased power usage when the cumulative power usage falls below a pre-established threshold.

10. The machine-readable storage medium of claim 9, wherein said power usage data corresponding to said server data processing system comprises a cumulative power usage reduction factor corresponding to said server data processing system, and said method further comprises selecting said power management operation based upon said cumulative power usage reduction factor utilizing said power management logic.

11. The machine-readable storage medium of claim 9, wherein said server data processing system further comprises a storage element to store data specifying a power usage threshold, and said method further comprises comparing said total power usage to said power usage threshold, and selecting said power management operation in response to said comparing utilizing said power management logic.

12. The machine-readable storage medium of claim 9, said method further comprising:

selecting a power management state of a plurality of power management states based upon said total power usage of said plurality of server data processing systems utilizing said power management logic.

\* \* \* \* \*